INVENTORS
SIDNEY BRUCE HUMPHREY
DAVID ROGER SMOAK
BY
ATTORNEY

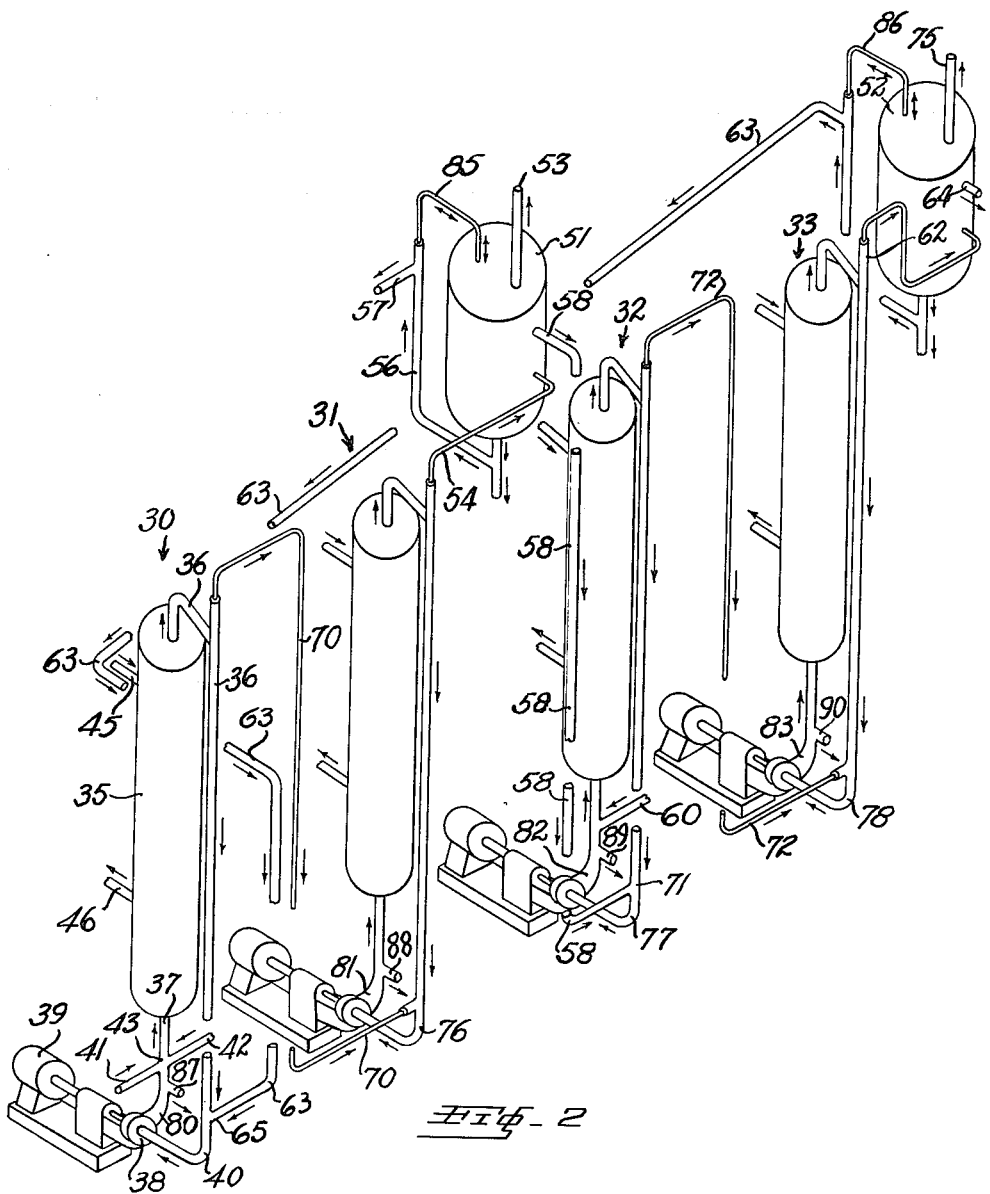

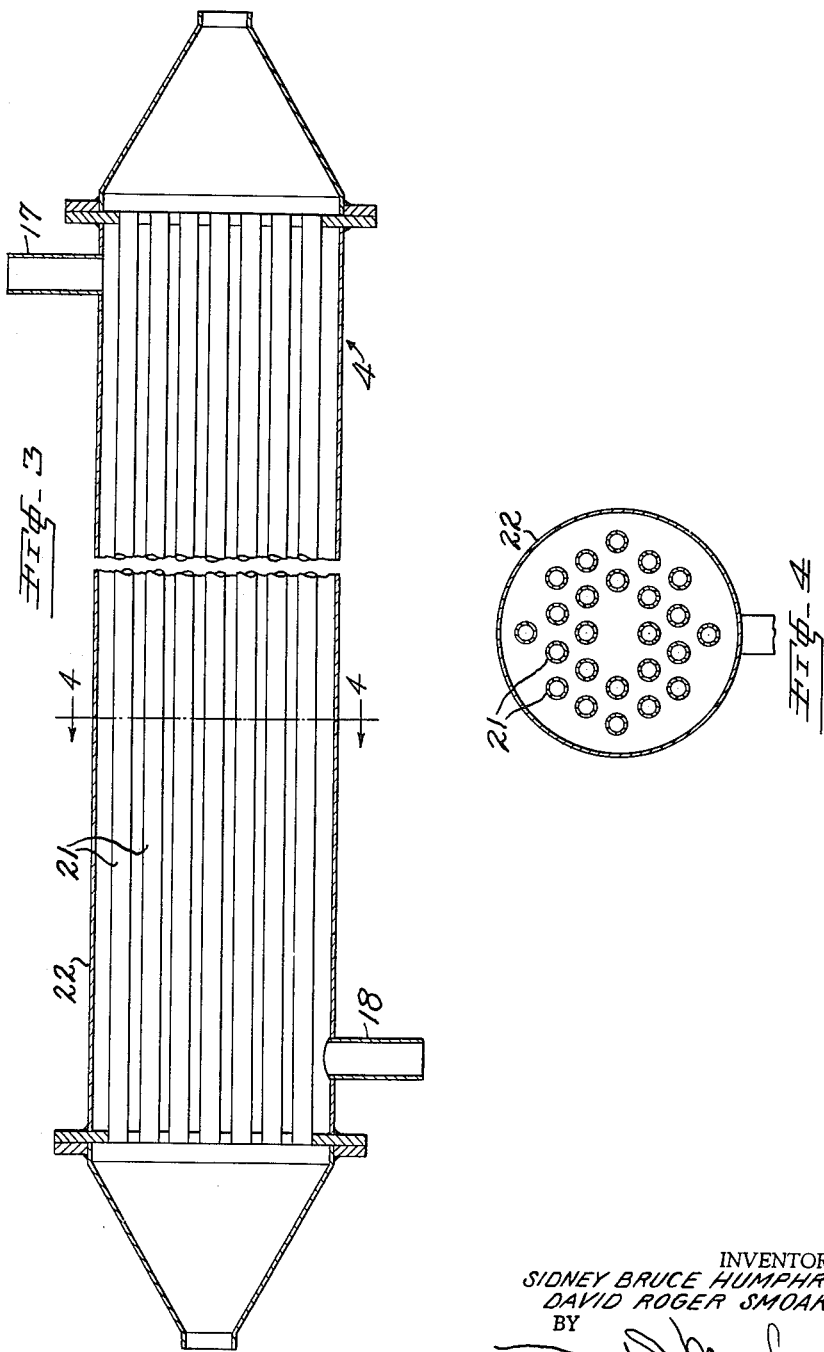

United States Patent Office 3,092,671
Patented June 4, 1963

---

3,092,671
NITRATION OF AROMATIC HYDROCARBONS
Sidney Bruce Humphrey and David Roger Smoak, Joliet, Ill., assignors to United States Rubber Company, New York, N.Y., a corporation of New Jersey
Original application Nov. 29, 1957, Ser. No. 699,608. Divided and this application Nov. 16, 1960, Ser. No. 72,270
7 Claims. (Cl. 260—645)

This invention relates to the nitration of aromatic organic compounds, e.g., aromatic hydrocarbons and particularly to a continuous process for nitration of benzene or toluene or nitration products thereof to form reaction products such as mononitrobenzene (MNB), dinitrobenzene (DNB), mononitrotoluene (MNT), dinitrotoluene (DNT) and trinitrotoluene (TNT).

The process of this invention may be applied to continuous nitration of various organic compounds including homocyclic aromatic compounds and substituted homocyclic aromatic compounds, such as benzene, substituted benzenes, naphthalene, substituted naphthalenes, alkyl benzene, substituted alkyl benzenes, polyalkyl benzenes, substituted polyalkyl benzenes, styrene, and heterocyclic aromatic compounds and substituted heterocyclic aromatic compounds, such as pyridine, amino pyridine, picoline, amino picoline, and quinoline, with or without the presence of solvents therefor. The details and application of the process and apparatus of this invention are conveniently described in terms of successive stages of nitration of benzene and toluene.

In the past, batch processes for nitration of aromatic compounds have been slow, and continuous or semi-continuous processes were considered more desirable, though prior attempts at commercial continuous processes were attended by various disadvantages. For example, some attempts involved handling of large volumes of explosive reactants, thereby raising the safety hazards to an intolerable level. Other attempts involved techniques which resulted in relatively long residence time of the reactants, excessive requirements for cooling surfaces, and low production per economic unit of cost.

The present invention, on the other hand, is continuous, adapted to automatic remote control and reduces safety hazards. In many instances, undesirable side or waste products are eliminated.

In general, the present invention involves the continuous nitration of aromatic compounds, by mixing said compounds with nitric acid and sulfuric acid to form a liquid reaction mass, pumping the reaction mass through a heat exchanger and cooling the mass, continuously withdrawing said reaction mass from said heat exchanger, withdrawing a portion of reaction products from said withdrawn mass, recirculating a portion, usually a greater portion, of the reaction mass through the heat exchanger, and during recirculation introducing further reactants or reaction mass into the recirculating stream of reaction mass. The volume of reaction mass withdrawn from the cycle is substantially equal in volume to further reactants introduced into the circulating stream of the cycle.

The apparatus utilized in the instant invention includes a circulation loop, means for continuously introducing a mixture of aromatic compound and nitrating agent into the loop, means within the loop, preferably a heat exchanger, for cooling the mixture of said compound and nitrating agent, and means such as a pump for recirculating the mixture, and means for withdrawing reaction products of the mixture from the loop.

The present process is continuous and the process may be readily controlled by commercially available and relatively inexpensive mechanical, pneumatic, and electronic control devices throughout the process. In general, the acids which can be used in this process are cheaper and more dilute than heretofore. Noxious, explosive and otherwise dangerous fumes are minimized and are not significantly detectable. Efficient heat transfer is accomplished. Thermal control of the reactants may be maintained within close limits over a wide range. Turbulent flow is maintained to an unusually high degree, resulting in good mixing, circulation and interaction of the reactants. Ordinary chemical processing equipment may be used, as distinguished from the prior requirements for specially designed and constructed processing equipment.

Other advantages of the invention are apparent from the ensuing description. For example, oxidation of dinitrotoluene is minimized, thereby minimizing the production of nitrosylsulfuric acid and consequent production of tetranitromethane which has the highest degree of brisance. In this process, the requisite operating quantity of nitric acid is kept at a minimum at all times by introducing the nitric acid in small quantities at various stages in the process, thereby minimizing oxidation.

The present continuous process involves low average reactant contact times (short residence times) and high space velocity in terms of pounds of reaction product per hour per gallon volumetric capacity of the system.

For example, in the present process contact time for continuous conversion of toluene to mononitrotoluene is of the order of 12 minutes, as distinguished from prior attempted continuous pilot and commercial plant operations ranging in contact time from 40 minutes to 3 hours. In the present process space velocity was on the order of 16 to 21 pounds of mononitrotoluene per hour per gallon volumetric capacity of the system. This compares with space velocities in the environs of 2.5 for prior pilot and commercial types of processes. Furthermore, the heat transfer coefficient (U) of the present system of the invention in B.t.u.'s/ft.$^2$/° F./hr. has values ranging between 20–60 as contrasted with U values of 3 to 5 for prior processes.

In the continuous nitration of mononitrotoluene to dinitrotoluene in the present invention, contact time is of the order of 4½ minutes as contrasted with the best prior times of 35–40 minutes. Space velocity for the present process of conversion of MNT to DNT ranges from about 24 to about 84.5 and higher pounds DNT/hr./gal. as contrasted with prior pilot and commercial continuous space velocities ranging from about 0.75 to about 2.1 pounds/hr./gal.

In the present process for nitrating dinitrotoluene to trinitrotoluene, space velocities range from about 3.75 to about 7.5, as contrasted with prior effective space velocities in the range of less than two.

In the present nitration of mononitrotoluene to trinitrotoluene, space velocities now range from 7.5 to 15, as contrasted with the best prior continuous processes which ranged from about 0.8 to about 2.1.

As indicated above, the present process has particular commercial effectiveness in nitrating benzene to mononitrobenzene, and in the production of mononitrotoluene, dinitrotoluene and trinitrotoluene. The desired TNT isomer is α-TNT, namely, 2,4,6-trinitrotoluene, among the 15 isomers which may be produced in successive degrees of nitration of toluene, there being three isomers of mononitrotoluene, six isomers of dinitrotoluene and six isomers of trinitrotoluene. The α-TNT isomer is about 95% of the theoretical reaction product, other isomers existing down to about .08% by weight. When dinitrotoluene is desired as the ultimate product of the present process, the 2:4-DNT isomer is preferred for military propellant purposes. When the invention is used to produce DNT as an intermediate in the ultimate production of TNT, the 2:4-

DNT is not isolated. When, however, 2:4 and 2:6-DNT is the desired end product as, for example, as an intermediate in the preparation of specific diisocyanates, it may be obtained by following the process of the present invention with well known normal techniques, such as "sweating": e.g., fractional crystallization and eutectic melting. Mononitrotoluene has commercial value as a dye intermediate.

The present invention is also advantageous over the prior techniques in which oleum was used in the production of TNT. The present process also substantially avoids the production of excess waste sulfuric acid, which has involved in a considerable economic and disposal problem.

In practicing mono- and bi-nitrations in accordance with the present continuous process, several other advantages have been obtained. The water-to-sulfuric acid ratio, which is a rate-determining factor in the nitration of toluene, has been improved from about 0.57 for complete bi-nitration in a batch process, to 1.0 or higher, thereby tolerating much greater quantities of water while still obtaining the same ultimate production results. In the manufacture of 2:4-DNT, the former requirement for strong nitric acid (98%) is eliminated and weak nitric (60%) suffices, thereby reducing costs by as much as half and eliminating the requirement for concentrating equipment to convert weak nitric to strong nitric acid. Water consumption is also decreased in some instances to about 0.05% of that used by existing processes.

A further advantage of the present process is that temperature variations in any one cycle, i.e., in any single nitration stage, need not exceed 3–5° F.

The degree of nitration of the end product can be controlled by controlling the temperature and controlling the relative proportions of nitric acid, sulfuric acid and water to each other and to the aromatic compound.

Certain present preferred embodiments of the invention are illustrated in the following examples and in the accompanying drawings, in which FIG. 1 is an isometric drawing of apparatus for continuous nitration;

FIG. 2 is an isometric drawing of apparatus for an advanced stage of continuous nitration;

FIG. 3 is a partially cut-away longitudinal cross-section of a heat exchanger useful in the present invention, and FIG. 4 is a cross-section view taken along the line 4—4 of FIG. 3.

Figure 1:
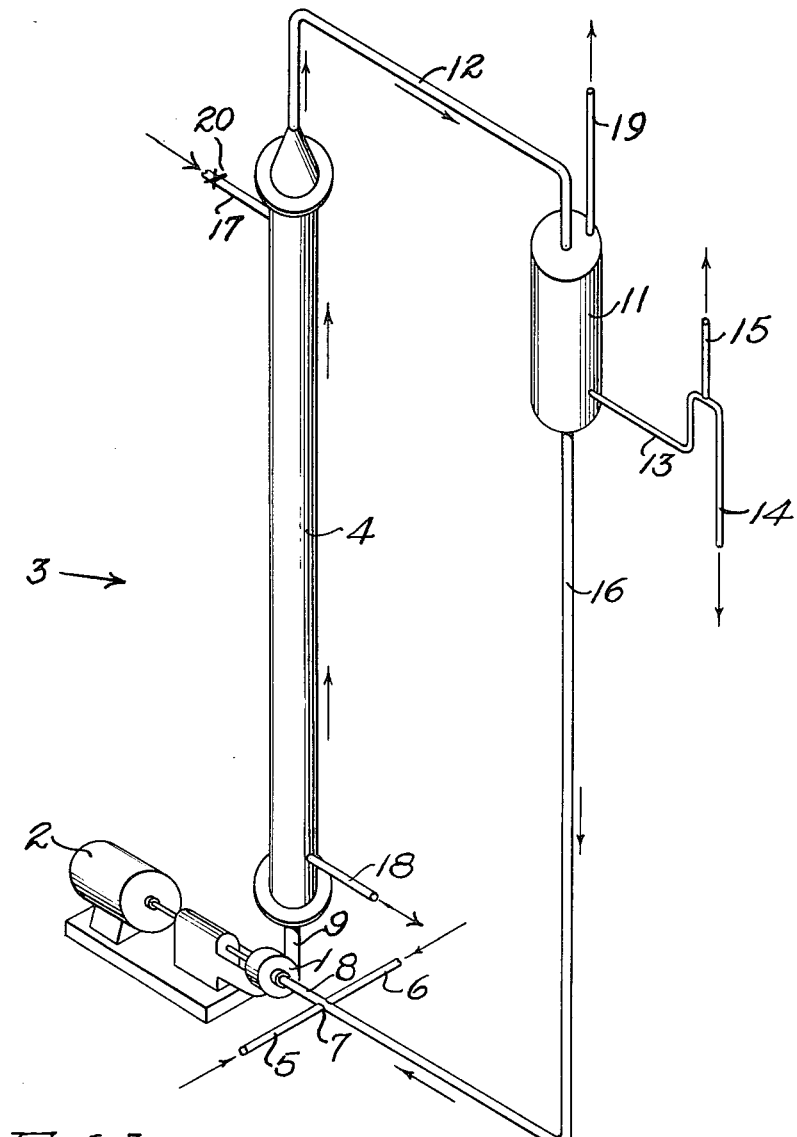

The apparatus shown in FIG. 1 may be conveniently used for mono-nitration of benzene. The di-nitration of toluene or benzene is performed in two separate stages; whereas the mono-nitration is performed in a single step or stage. For the further (tri-) nitration of toluene, the apparatus of FIG. 2 is additionally used.

Referring to FIG. 1, a centrifugal pump 1 is driven by a suitable motor 2 and is in a recycling or recirculation loop 3 having a shell and tube heat exchanger 4 (described in more detail in connection with FIGS. 3 and 4). The acid reactants, namely, mixed acid (sulfuric, nitric and water) are fed through an inlet line 5, and the hydrocarbon (e.g. benzene, toluene or nitrotoluene, etc.) is fed into inlet line 6, which lines meet at a mixing cross 7 in the reaction loop 3. The reactants are metered into the system by appropriate known means, such as positive displacement proportioning pumps which may serve both to pump and to meter. From the mixing cross 7 the reactants flow through pump inlet connection pipe 8 to the centrifugal pump 1 where they are thoroughly mixed and further impelled through the pump outlet pipe 9, thence into the tube side of the heat exchanger 4 to ensure turbulent flow. From the heat exchanger 4 the reactants enter a "surge tank" 11 via pipe connection 12 from which an amount of reaction mixture substantially equal to the amount of reactants introduced at 5 and 6 is taken from the system through line 13 to a separator or appropriate receiver via pipe line 14 which is provided with a syphon breaker 15. The surge tank 11 is provided with a vent stack 19. A greater portion of the reaction mass, which is not bled from the system at exit line 13 enters the recycle line 16 and is continued in transit to the mixing cross 7. The heat capacity of the recycled material is sufficient to absorb the heat of reaction and control the system through the centrifugal pump into the heat exchanger where the heat is removed. Cooling fluid, such as cold water, enters the shell side of the heat exchanger 4 at upper line 17 and is discharged at lower line 18, thereby causing the coolant to flow countercurrently with the reactants.

Referring to FIGS. 3 and 4, the heat exchanger is of conventional construction in which a series of tubes 21 are connected to provide a plurality of relatively narrow elongated reaction chamber compartments to ensure a high degree of turbulence in the circulation and recirculation cycle of the reaction mass. The shell 22 of the heat exchanger 4 is preferably utilized as the conduit for the coolant. In practice it was found that this means for obtaining the requisite turbulence was advantageous in the process. This arrangement provided a relatively high availability ratio of cooling surface to reaction mass in the reaction chamber by means of a series of individually relatively constricted compartments to ensure mixing.

PRODUCTION OF NITRO BENZENE

Using the apparatus of FIG. 1, the advantages of the present invention may be realized, resulting in a continuous process having high space velocities and avoiding the attendant disadvantages discussed above.

In one run, 400 lbs. of benzene were introduced into the apparatus per hour and 1135 lbs. of acid were introduced per hour. The introduced mixed acid (B) contained 55.95% by weight of sulfuric acid, 31.40% by weight of nitric acid, 12.50% by weight of water, and the nitrosyl sulfuric acid was 0.15%. The DVS (dehydrating value of the sulfuric acid) was maintained at 2.61 in this particular mixed acid, thereby preventing production of dinitrobenzene which occurs significantly in the reaction only at DVS values in excess of 2.70. Production, operating conditions, and quality results are stated below. Other rates of benzene feed were used with the same mixed acid (B) and with another mixed acid (C- containing 58.21 weight percent sulfuric, 22.28% nitric, 19.50% water, and nitrosyl sulfuric weight percent 0.01. Mixed acid (C) had a DVS value of 2.19.

The particular equipment used in Examples 1–4, for the production of nitrobenzene, is shown in FIG. 1. The mixed acids were first prepared in a make-up tank and then pumped through a proportioning pump to the inlet 5 of the nitrator. The benzene was pumped through a centrifugal pump recycle system and a portion fed through a regulator to admit benzene at a predetermined rate into the system via inlet pipe 6. Rates of acid and benzene feed were checked with rotameters. In the start-up stage the system was filled with 80% sulfuric acid and recirculated until the unit was brought up to the operating temperature using hot water in the shell side of the heat exchanger to heat the mass in chamber 4. Then the benzene and the acid were started into the system at mixing cross 7, thence into the intake of the centrifugal pump 1. The reactants were pumped up through the recirculation loop 3. The product stream was overflowed to the separator via overflow outlet 14. It was found that a capacity of about 110 gals. per minute in the centrifugal pump for the existing head was sufficient to maintain adequate turbulent conditions throughout the cycling loop. Temperature of the nitrator was indicated and recorded and checked on standard equipment well known in the art and temperature was controlled by regulating the cooling water entering at 17 with a direct acting flow regulator indicated on the drawing as valve 20. The danger of sudden temperature rise was averted by providing means, such as regulator by-pass for turning on cooling water in much larger quantities than under normal operating conditions and by shutting off the benzene and acid feeds. Further safety means included provision for drowning the entire reaction mass by immediate emergency release from the entire recycling loop.

From the nitrating loop 3, a lesser portion of reaction products were removed through pipe 14 (acid and nitrobenzene) to a gravity separator. Waste acid was taken off the bottom of the separator by normal means and flowed to a storage tank and nitrobenzene was taken off at the top of the separator and flowed by gravity to the nitrobenzene storage tank. Nitrobenzene was checked for specific gravity by a hydrometer and analyzed by an infrared spectrophotometer. Acids were analyzed by standard methods.

Four examples are illustrated in Tables I and II.

Table I

| Ex. No. | Feed benzene, lbs./hr. | Feed acid, lbs./hr. | Mixed acid used | Nitrator temp., °F. | Water temp., °F. | | Water flow, gals./min. |
|---|---|---|---|---|---|---|---|
| | | | | | In | Out | |
| 1 | 400 | 1,135 | B | 140 | 49 | 78 | 26 |
| 2 | 400 | 1,061 | B | 140 | 46 | 84 | 16.0 |
| 3 | 300 | 1,131 | C | 139 | 40 | 113 | Below 10 |
| 4 | 300 | 1,131 | C | 149 | 40 | 134 | Below 10 |

SPENT ACID ANALYSIS

| Ex. No. | Oil analysis[1] | | Acid analysis | | | |
|---|---|---|---|---|---|---|
| | Percent $C_6H_6$ | Percent $C_6H_5NO_2$ | Percent $H_2SO_4$ | Percent $HNO_3$ | Percent $HNOSO_4$ | Percent $H_2O$ |
| 1 | 0.5 | 0.0 | 74.69 | 0.06 | 0.15 | 24.60 |
| 2 | 0.60 | 0.0 | 71.89 | 0.31 | 0.22 | 26.98 |
| 3 | 0.80 | 0.0 | 71.78 | 0.24 | 0.42 | 26.76 |
| 4 | 0.50 | 0.0 | 68.09 | 1.79 | 0.38 | 29.23 |

[1] Organic material dissolved in the spent acid.

Table II
CALCULATIONS

| Ex. No. | Conversion of benzene | Lbs. benzene converted/ hr./gal. | Space velocity, lbs. MNB/ hr./gal. | Heat transfer coeff., "U" | Nitric: benzene mole ratio | DVS acid |
|---|---|---|---|---|---|---|
| 1 | 99.3 | 16.20 | 23.52 | 82.0 | 1.07 | 2.61 |
| 2 | 99.1 | 16.18 | 23.50 | 63.5 | 1.03 | 2.61 |
| 3 | 98.7 | 12.08 | 19.03 | (1) | 1.07 | 2.19 |
| 4 | 99.3 | 12.15 | 19.14 | (1) | 1.07 | 2.19 |

[1] Water flow below minimum of control instrument (not measured).

NITRATION OF TOLUENE

Mononitrotoluene was produced in the apparatus of FIG. 1 continuously in a single stage process. Dinitrotoluene was also produced in a single stage process in the same apparatus by feeding mononitrotoluene (mono oil) and appropriate mixed acid into the reaction and recirculation loop.

Table III shows results of the nitration of various feeds obtained in Examples 5 through 12, Examples 5 and 6 relating to mononitration of toluene; and Examples 7 through 12 relating to mononitration of mononitrotoluene. The rates of feed of toluene and mononitrotoluene are stated and in each example the system was readily controlled thermally as described in the nitrobenzene examples. Appropriate conversion may be achieved using mixed acid having an $H_2O/H_2SO_4$ ratio in the range from about .5 to about 1.5. Known refining techniques are used, e.g., for removing the 2:4-DNT from the DNT isomer mixture. It is to be noted that space velocities ranged from about 16 to about 21 in the mononitration of toluene and from about 24 to about 85 in the binitration of toluene.

Table III

| Ex. No. | Toluene feed, lbs./hr. | Mixed acid analysis | | |
|---|---|---|---|---|
| | | Percent $HNO_3$ | Percent $H_2SO_4$ | Percent $H_2O$ |
| 5 | 244 | 22.7 | 55.7 | 14.0 |
| 6 | 184 | 23.84 | (1) | (1) |

| Ex. No. | Mono Oil Feed | | Mixed acid analysis | | |
|---|---|---|---|---|---|
| | MNT | | Percent $HNO_3$ | Percent $H_2SO_4$ | Percent $H_2O$ |
| | Lbs./hr. | Percent DNT | Moles/hr. | | | |
| 7 | 1,111 | 17.5 | 6.8 | 24.83 | 67.73 | 7.30 |
| 8 | 310 | 7.4 | 2.1 | 12.0 | 74.6 | 13.4 |
| 9 | 310 | 7.4 | 2.1 | 15.0 | 69.8 | 15.2 |
| 10 | 310 | 7.4 | 2.1 | 13.45 | 72.0 | 14.55 |
| 11 | 355 | | 2.58 | 13.84 | 71.8 | 14.4 |
| 12 | 414 | | 3.02 | 13.7 | | 14.6 |

| Ex. No. | Mixed acid feed | | | Reaction temperature, °F. | |
|---|---|---|---|---|---|
| | Lbs./hr. | Moles | | Suction side | Discharge side |
| | | $HNO_3$ | $H_2O/H_2SO_4$ | | |
| 5 | 730.0 | 2.65 | 1.48 | 134 | 134 |
| 6 | 549.0 | 2.0 | 1.48 | 133 | 136 |
| 7 | 1,790 | | .57 | 181 | 180 |
| 8 | 1,110.0 | 2.1 | .90 | 173 | 170 |
| 9 | 872.0 | 2.1 | 1.38 | 173 | 170 |
| 10 | 974.0 | 2.1 | 1.12 | 171 | 170 |
| 11 | 1,174 | 2.58 | 1.0 | 173 | 170 |
| 12 | 1,377 | 3.02 | | 187 | 185 |

| Ex. No. | Cooling water, °F. | | | Heat transfer, U | Conversion | | |
|---|---|---|---|---|---|---|---|
| | Inlet | Outlet | G.p.m. | | Percent MNT | Percent DNT | Percent TNT |
| 5 | 64 | 68 | | | 92.4 | 7.6 | |
| 6 | 66 | 98 | 7.80 | 59.2 | 86.9 | 15.1 | |
| 7 | 64 | 122 | 9 | 85.0 | .3 | 97.9 | 1.8 |
| 8 | 63 | 165 | 1.5 | 65.2 | | 97.3 | 2.7 |
| 9 | 64 | 166 | 1.0 | 46.4 | 3.0 | 94.0 | 3.0 |
| 10 | 64 | 167 | 1.25 | 63.7 | 0.8 | 96.8 | 2.4 |
| 11 | 64 | 159 | 2.3 | 72.8 | 3.5 | 93.7 | 2.8 |
| 12 | 64 | 169 | 2.3 | 67.4 | 1.6 | 96.1 | 2.3 |

| Ex. No. | Spent acid analysis | | | | | MNT produced, lbs./hr. | DNT produced, lbs./hr. | Space velocity, lbs./hr./gal. |
|---|---|---|---|---|---|---|---|---|
| | Percent $H_2SO_4$ | Percent $HNO_3$ | Percent $HNOSO_4$ | Percent $H_2O$ | Percent N.B.[2] | | | |
| 5 | 68.6 | 7.3 | 1.2 | | | 363.0 | | 21.3 |
| 6 | 72.65 | .93 | 2.2 | | | 274.0 | | 16.1 |
| 7 | 76.4 | 1.0 | 1.9 | 16.8 | 3.8 | | 1,435 | 84.4 |
| 8 | 78.5 | 1.0 | 0.13 | 18.0 | 2.3 | | 407 | 23.9 |
| 9 | 75.33 | 1.50 | 0.72 | 20.5 | 2.0 | | 407 | 23.9 |
| 10 | 76.86 | 1.25 | 0.54 | 19.62 | 1.73 | | 407 | 23.9 |
| 11 | 77.0 | 0.69 | 0.32 | 18.9 | 3.05 | | 498 | 29.3 |
| 12 | 77.0 | 0.77 | 0.36 | 18.8 | 3.00 | | 583 | 34.3 |

[1] Not measured.
[2] N.B. is "nitro body," i.e. organics in solution.

PRODUCTION OF TRINITROTOLUENE

Referring to FIG. 2 of the drawing, apparatus for the mononitration of dinitrotoluene is shown as a multi-stage steady flow continuous system. The nitration units or nitrators 30, 31, 32 and 33 are circulation loops, partly broken away in the drawing, arranged similarly to that shown in FIG. 1. For example, in nitrator 30, there is the heat exchanger 35, circulation line 36, input line 37, pump 38 driven by motor 39, and return end 40 of circulation line 36. Acid feed line 41 meets bi-oil DNT feed line 42 at mixing cross 43. Cooling water is introduced into the jacket of the heat exchanger at pipe 45 and withdrawn at pipe 46. This 4-unit system is provided with two similar gravity separators 51 and 52. The gravity separator 51 has a vent line 53 and an intake line 54 connected to the nitration loop 31. Spent acid is removed from the separator 51 through line 56 to a return pipe 57 to be refed back into the dinitration unit shown in FIG. 1. Dinitrotoluene-trinitrotoluene mix is taken from separator 51 into pipe 58 and fed through pipe line 58 into circulation loop 32. In this loop further tri-mixed acid is introduced at line 60.

The final product taken into separator 52 from circulation loop 33 at take-off line 62 is partially spent mixed acid which is removed and re-fed to nitrator 30 from line 63, and molten crude TNT which is taken from the separator 52 via line 64. Pipe line 63 reconnects with the circulation loop 30 at joint 65.

In operating the apparatus and using the method illustrated in FIG. 2, as tabulated below in Table IV (Examples 13 through 16), a 98% nitric acid butt is introduced together with dinitrotoluene into feed lines 41 and 42, respectively. The tri-mixed acid is introduced at the line 60 into nitrator 32. This acid in the examples was 90% sulfuric and 10% nitric, although other proportions may be used, for example, 85% sulfuric and 15% nitric. In either event, an important contribution of the present invention is that no oleum is used and no excess of $SO_3$ is required, as contrasted with prior processes requiring 20% or 40% oleum: e.g., 40% excess of $SO_3$ over the $SO_3$ present in 100% sulfuric acid. The substantial absence of oleum permits the use of simpler and less expensive equipment. The absence of oleum permits the absence of the usual expensive and complicated oleum manufacturing equipment.

The contents of nitration loop 30 are circulated and the reaction proceeds. Heat is removed by the heat exchanger so that the reaction temperature is kept within the range 210° F. to 260° F. The amount of reaction mass is forced into the nitration loop 31 via exit line 70 in a volume amount substantially equal to the amount of feed being introduced into reaction loop 30 by pipe lines 41, 42 and 65. The same process continues in the nitration loop 31, the excess being forced into separator 51 via take-off line 54.

In the separator 51, the heavy acid phase is separated from the light organic (oil) phase by gravity. The acid phase leaves the trinitration stage via pipe 57 and reverts back to a binitration stage where it is butted with nitric acid and used again for the binitration. The oil phase is then introduced via pipe 58 into nitration loop 32 at connection 71. It is then contacted with fresh trimixed acid introduced at pipe 60.

A quantity of reaction mass equal to the amount introduced into nitration loop 32 is removed via line 72 and forced into nitration loop 33. The reaction product of nitration loop 33 is taken off at line 62 and introduced into separator 52 wherein the oil phase is again separated from the acid phase. At this stage, the oil phase is completely or substantially completely nitrated to trinitrotoluene. The molten crude TNT is withdrawn from the separator at pipe 64 and is subsequently refined by known TNT refining techniques. The partially spent acid phase is removed from the separator at line 63 and re-supplied to nitration loop 30 where it furnishes all of the sulfuric, and a proportion of the nitric acid required in nitration loops 30 and 31. The process thus operates continuously.

Table IV shows the reaction conditions and products at the respective nitration loops in a 4-unit continuous TNT plant. Table IV includes typical specific conditions at the various nitrators in Examples 13 and 14, and the final operating conditions for Examples 15 and 16.

Table IV

TRINITRATION-CONVERSION OF DINITROTOLUENE TO TRINITROTOLUENE

Nitrator Unit 30

| Ex. No. | Bi-oil feed, lbs./hr. | Acid[1] feed, lbs./hr. | Reaction temp., °F. | Percent TNT | Percent DNT | Spent acid | |
|---|---|---|---|---|---|---|---|
| | | | | | | Percent $HNO_3$ | Percent $HNOSO_4$ |
| 13 | 300 | 1,300 | 238 | 70 | 30 | 1.49 | 7.38 |
| 14 | 300 | 1,905 | 240 | 74 | 26 | 3.08 | 5.50 |

Nitrator Unit 31

| 13 | 0 | 498 | 233 | 88 | 12 | 2.61 | 6.73 |
| 14 | 0 | 0 | 242 | 88 | 12 | 1.72 | 6.93 |

Nitrator Unit 32

| 13 | 0 | 810 | 240 | 99 | 1 | 6.09 | 1.32 |
| 14 | 0 | 810 | 240 | 96 | 4 | 5.73 | 1.80 |

Nitrator Unit 33

| 13 | 0 | 0 | 225 | 100 | 0 | 5.79 | 1.54 |
| 14 | 0 | 0 | 220 | 99.8 | 0.2 | 5.44 | 2.53 |

| Example No. | TNT lbs./hr. produced | Space velocity, lbs./gal./hr. |
|---|---|---|
| 13 | 374 | 3.74 |
| 14 | 373 | 3.74 |

[1] Acid analysis: 90%, $H_2SO_4$; 10%, $HNO_3$.

| Ex. No. | Bi-oil feed, lbs./hr. | Acid feed (tri-mix,)[1] gal./hr. | 98% $HNO_3$ butt, gal./hr. | Reaction temp., °F. | TNT produced, lbs./hr. | Space velocity, lbs./gal./hr. |
|---|---|---|---|---|---|---|
| 15 | 300 | 75 | 8 | 240 | 375 | 3.74 |
| 16 | 600 | 150 | 16.0 | 240 | 750 | 7.5 |

[1] Acid analysis: 86.5%, $H_2SO_4$; 13.5%, $HNO_3$.

In practicing the present invention the reaction temperature for mononitration of toluene is generally between about 115 and 165° F.; dinitration of toluene between about 135 and 190° F. The trinitration stage from DNT to TNT preferably is maintained between about 185 and about 260° F. The recycle ratio (i.e., ratio of recycled reaction mass to withdrawn mass, by weight, per unit of time) conveniently ranges from 5:1 to 200:1. For example, in the continuous production of nitrobenzene the recycle ratio may conveniently be maintained at between 3:1 and 60:1, and the temperature of reaction may be between 120° F. and 150° F.

The relatively high recycle ratios of the present continuous process enable initial and continued control of the reaction mass temperature.

The relatively low quantities of nitric acid are continuously introduced into the nitration system to prevent the first separator 51 from becoming an explosive nitrator. For example, less than 3% of the total acid phase present in separator 51 is nitric acid. It will be noted that in separator 52 the oil phase is substantially 100% TNT and the quantity of DNT is zero or very small. The vent 53 in separator 51, and corresponding vent 75 in separator 52 remove gases from the reaction mass, thereby insuring positive interface formation during the continuous separation stage. In order to prevent the pumps from overloading, the return lines 40, 76, 77 and 78 in the respective nitration loops have restricted orifices as contrasted with the upper, or take-off orifices 80, 81, 82 and 83. The pumps preferably have no metal-to-metal contact, thereby avoiding the danger of detonating solid TNT as when the plant has been shut down. TNT melts at about 80° C. and DNT at about 70° C. Lines 85 and 86 are, respectively, vacuum breakers for return lines 57 and 63. Outlets 87, 88, 89, 90 are drain lines for "drowning" the entire contents of the system, as, for example, in emergencies in the event of a dangerous temperature rise.

The mol ratio of sulfuric to nitric acid is maintained at least at 2:1. Production of nitrobenzene according to the present process occurs at a rate of at least about 15 lbs. of nitrobenzene per hour per gallon of reactor capacity; MNT rate is about at least 10 lbs. per hour per gallon; DNT rate is at least 35 lbs. per hour per gallon; and TNT rate is at least about 2 lbs. per hour per gallon. Water may be present in the nitration of toluene to MNT in excess of 25% of the weight of total acid introduced into the reactor; and in the MNT to DNT reaction at least 10% of water is present.

*Example 17.*—This example illustrates actually measured material balance in the trinitration stage of a preliminary TNT pilot plant of the type shown in FIG. 2. 286 lbs. of dinitrotoluene (bi-oil) are introduced with 105 lbs. per hour of 98% nitric acid (0.9 lb. $HNOSO_4$, 101.3 lbs. $HNO_3$, and 2.8 lbs. $H_2O$) at entrance 37 into nitrator unit 30. This is in addition to semi-waste acid recirculated via line 63 from separator 52. Organic contents of nitrator 30 are 74.9% TNT and 25.1% DNT.

The organic content of nitrator unit 31 is 83.5% TNT and 16.5% DNT. The acid phase ("tri-waste") leaving separator 51 via pipe 57 is 1459 lbs. per hour; comprising 243.1 lbs. $HNOSO_4$, 35.6 lbs. $HNO_3$, 945.0 lbs. $H_2SO_4$, 115.4 lbs. $H_2O$, 96.6 lbs. TNT, and 23.5 lbs. DNT.

The tri-mixed acid is introduced at line 60 into nitrator 32 at the rate of 1269 lbs. per hour, comprising 1.3 lbs. $HNOSO_4$, 173.6 lbs. $HNO_3$, 1094.0 lbs. $H_2SO_4$ and negligible water. Typical tri-mix ratio of sulfuric acid to nitric acid may conveniently be about 85% to 90% sulfuric and about 15% to 10% nitric.

Nitrator unit 32 contains only very small percentage of DNT and approaches 100% TNT; nitrator unit 33 contains no significant quantity of DNT whatever: i.e., it contains effectively 100% of TNT as nitration product. The tri-oil is removed from separator 52 at the rate of 211.5 lbs. per hour, comprising 198.4 lbs. TNT, 7.6 lbs. $HNO_3$, and 5.5 lbs. $H_2SO_4$.

*Example 18.*—One part of dinitromethylaniline was dissolved in six parts of 88% sulfuric acid by weight. Four parts of this solution with two parts of mixed acid and two parts dichloroethylene by volume were introduced into the apparatus of FIGURE 1. The mixed acid was 30% sulfuric acid, 50% nitric acid and 20% water, by weight. The continuous nitration of product of this reaction is tetryl, i.e., tetranitromethylaniline, methylnitropicramide, tetralite, or 2,4,6-trinitrophenylmethylnitramine. The dichloroethylene acted as a solvent, particularly as a carrier for the tetryl and assisted in the final separation of the organic final product from the spent acids.

This application is a division of our copending application Serial No. 699,608, filed November 29, 1957.

While certain present preferred embodiments of the invention have been shown and described, it is to be understood that the invention may otherwise be practiced and embodied within the spirit of the invention, which is to be construed as being limited only by the scope of the claims.

What is claimed is:

1. A continuous method of nitrating aromatic hydrocarbons and partial nitration products thereof which comprises thoroughly mixing a compound selected from the group consisting of aromatic hydrocarbons and partial nitration products thereof with a nitrating acid, impelling the resultant mixture through a heat exchanger under conditions of turbulent flow, continuously withdrawing said mixture from said heat exchanger, withdrawing a lesser portion of said mixture from the remainder of said mixture, recirculating said remainder to the initial mixing zone to absorb the heat of reaction and thereby control the reaction prior to impelling the mixture into said heat exchanger, and during recirculation introducing further quantities of said compound and said mixed acid into said initial mixing zone, the volume of said lesser portion being substantially equal to the volume of said further quantities.

2. The method of nitrating aromatic hydrocarbons and partial nitration products thereof which comprises introducing and thoroughly mixing a compound selected from the group consisting of aromatic hydrocarbons and partial nitration products thereof, and sulfuric acid and nitric acid, the weight ratio of sulfuric acid to nitric acid being greater than 1:1, into a circulating stream of a reaction mass comprising said compound, said acids and reaction products thereof, impelling said reaction mass through a heat exchanger under conditions of turbulent flow, continuously withdrawing said reaction mass from said heat exchanger, withdrawing a lesser portion of said reaction mass from the remainder of said mass, and recirculating said remainder to the initial mixing zone in order to absorb the heat of reaction and thereby control the reaction prior to the impelling of the reaction mass into the heat exchanger, the volume of said lesser portion being substantially equal to the volume of the introduced compound and mixed acid.

3. The method of claim 1, in which the mixture formed in said initial mixing zone is impelled under conditions of turbulent flow through a plurality of relatively narrow elongated reaction chamber compartments, which compartments are surrounded by a circulating cooling fluid.

4. The method of claim 1, in which said introduced compound is benzene, in which the reaction temperature of said mixture in said initial mixing zone and until said mixture is impelled into said heat exchanger is maintained at between 120° F. and 150° F., and in which the space velocity is at least 19 pounds of mono-nitrobenzene per hour per gallon volumetric capacity of the system.

5. The method of claim 1, in which said introduced compound is toluene, in which the temperature of the mixture formed in said initial mixing zone and until it is impelled into said heat exchanger is maintained at between 115° F. and 165° F., and in which the space velocity is in the range from 16 to 21 pounds of mono-nitrotoluene per hour per gallon volumetric capacity of the system.

6. The method of claim 1, in which said introduced compound is mono-nitrotoluene, in which the temperature of said mixture formed in said initial mixing zone is maintained at between 135° F. and 190° F. until said mixture is impelled into said heat exchanger, and in which the space velocity is maintained in the range from 24 to 84.5 pounds of di-nitrotoluene per hour per gallon volumetric capacity of the system.

7. The method of claim 1, in which said introduced compound is di-nitrotoluene, in which the temperature of the mixture formed in said initial mixing zone is maintained at from 185° F. to 260° F. until said mixture is impelled into said heat exchanger, and in which the space velocity is maintained in the range from 3.75 to 7.5 pounds of tri-nitrotoluene per hour per gallon volumetric capacity of the system.

References Cited in the file of this patent

UNITED STATES PATENTS

| | | |
|---|---|---|
| 2,737,522 | Nilsson | Mar. 6, 1956 |
| 2,951,877 | Kouba et al. | Sept. 6, 1960 |